(12) United States Patent
Xue et al.

(10) Patent No.: US 12,254,707 B2
(45) Date of Patent: Mar. 18, 2025

(54) PRE-TRAINING FOR SCENE TEXT DETECTION

(71) Applicants: Lemon Inc., Grand Cayman (KY); Beijing Youzhuju Network Technology Co., Ltd., Beijing (CN)

(72) Inventors: Chuhui Xue, Singapore (SG); Wenqing Zhang, Singapore (SG); Yu Hao, Beijing (CN); Song Bai, Singapore (SG)

(73) Assignees: LEMON INC., Grand Cayman (KY); BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 346 days.

(21) Appl. No.: 17/955,285

(22) Filed: Sep. 28, 2022

(65) Prior Publication Data

US 2024/0119743 A1    Apr. 11, 2024

(51) Int. Cl.
*G06V 20/62*      (2022.01)
*G06V 30/18*      (2022.01)
*G06V 30/19*      (2022.01)

(52) U.S. Cl.
CPC .............. *G06V 20/63* (2022.01); *G06V 30/18* (2022.01); *G06V 30/19093* (2022.01); *G06V 30/19147* (2022.01)

(58) Field of Classification Search
CPC .. G06V 20/63; G06V 30/18; G06V 30/19147; G06V 30/19093
See application file for complete search history.

(56) References Cited

U.S. PATENT DOCUMENTS

| | | | |
|---|---|---|---|
| 2015/0055854 A1* | 2/2015 | Marchesotti | G06F 18/2178 382/159 |
| 2016/0210532 A1* | 7/2016 | Soldevila | G06V 20/62 |

FOREIGN PATENT DOCUMENTS

| | | |
|---|---|---|
| CN | 114565751 A | 5/2022 |
| CN | 111858882 B | 8/2022 |
| CN | 114998678 A | 9/2022 |

* cited by examiner

*Primary Examiner* — Quang N Vo
(74) *Attorney, Agent, or Firm* — Astute IP Law Group (57) ABSTRACT

Embodiments of the present disclosure relate to a method, device and computer readable storage medium of scene text detection. In the method, a first visual representation of a first image is generated with an image encoding process. A first textual representation of a first text unit in the first image is generated with a text encoding process based on a first plurality of symbols obtained by masking a first symbol of a plurality of symbols in the first text unit. A first prediction of the masked first symbol is determined with a decoding process based on the first visual and textual representations. At least the image encoding process is updating according to at least a first training objective to increase at least similarity of the first prediction and the masked first symbol.

20 Claims, 6 Drawing Sheets

PRE-TRAINING FOR SCENE TEXT DETECTION

FIELD

Embodiments of the present disclosure generally relate to the field of telecommunication and, in particular, to a method, device and computer readable storage medium of pre-training for scene text detection.

BACKGROUND

Optical Character Recognition (OCR), including, for example, scene text detection, recognition, and spotting, is a hot technique in both computer vision and deep learning research due to its wide range of applications in multilingual translation, autonomous driving, and/or the like. Most of OCR techniques may follow a computer vision pipeline where visual features may be first extracted from the input image and then feature regression or classification may be performed for text detection and recognition. Vision-language pre-training (VLP) approaches are being developed to promote many multi-modal tasks in computer vision such as Visual Commonsense Reasoning (VCR), Visual Question Answering (VQA), Image-Text Retrieval. However, the image-text pairs (for example, images and texts therein) for OCR tasks may be difficult to obtain.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It may be understood that data involved in the present technical solution (including but not limited to the data itself, the acquisition or use of the data) should comply with requirements of corresponding laws and regulations and relevant rules.

It may be understood that, before using the technical solutions disclosed in various implementation of the present disclosure, the user should be informed of the type, scope of use, and use scenario of the personal information involved in the present disclosure in an appropriate manner in accordance with relevant laws and regulations, and the user's authorization should be obtained.

For example, in response to receiving an active request from the user, prompt information is sent to the user to explicitly inform the user that the requested operation will need to acquire and use the user's personal information. Therefore, the user may independently choose, according to the prompt information, whether to provide the personal information to software or hardware such as electronic devices, applications, servers, or storage media that perform operations of the technical solutions of the present disclosure.

As an optional but non-limiting implementation, in response to receiving an active request from the user, the way of sending prompt information to the user, for example, may include a pop-up window, and the prompt information may be presented in the form of text in the pop-up window. In addition, the pop-up window may also carry a selection control for the user to choose "agree" or "disagree" to provide the personal information to the electronic device.

It may be understood that the above process of notifying and obtaining the user authorization is only illustrative and does not limit the implementation of the present disclosure. Other methods that satisfy relevant laws and regulations are also applicable to the implementation of the present disclosure.

As used herein, "text unit" refers to a unit of a text. A text unit may comprise one or more text tokens or elements. A text token or element may include one or more symbols, characters, words, phrases or any other elements that may appear in a natural language expression. In some embodiments, a text unit may comprise a plurality of symbols. The granularity of a text unit may be changed and set according to applications. In the context of the present disclosure, the terms "text unit" and "text instance" may be used interchangeably for the purpose of discussion convenience.

As used herein, "visual representation" refers to one or more visual features of an image. The visual features may be extracted from the image and indicate visual characteristics or information (such as pixel-level characteristics) of the image. The visual feature may be implemented in a form of a vector, an embedding, a matrix and/or the like.

As used herein, "textual representation" refers to one or more textual features of a text. The visual features may be extracted from the text and indicate textual characteristics or information (such as semantics or context) of the text. The visual feature may be implemented in a form of a one-dimensional or multidimensional vector, an embedding, a matrix and/or the like.

As used herein, the term "a learning process", "a training process" or "updating process" refers to using experience or data to optimize a system performance process. For example, an image encoder may gradually optimize image encoder performance through learning, training or updating processes, such as improving accuracy of scene text detection, recognition and/or spotting. In the context of the present disclosure, the terms "training", "learning" or "updating" may be used interchangeably for the purpose of discussion convenience.

As used herein, the term "model" is referred to as an association between an input and an output learned from training data, and thus a corresponding output may be generated for a given input after the training. The generation of the model may be based on a machine learning technique. The machine learning techniques may also be referred to as artificial intelligence (AI) techniques. In general, a machine learning model can be built, which receives input information and makes predictions based on the input information. For example, a classification model may predict a class of the input information among a predetermined set of classes. As used herein, "model" may also be referred to as "machine learning model", "learning model", "machine learning network", or "learning network," which are used interchangeably herein.

Generally, machine learning may usually involve three stages, i.e., a training stage, a validation stage, and an application stage (also referred to as an inference stage). At the training stage, a given machine learning model may be trained (or optimized) iteratively using a great amount of training data until the model can obtain, from the training data, consistent inference similar to those that human intelligence can make. During the training, a set of parameter values of the model is iteratively updated until a training objective is reached. Through the training process, the machine learning model may be regarded as being capable of learning the association between the input and the output (also referred to an input-output mapping) from the training data. At the validation stage, a validation input is applied to the trained machine learning model to test whether the model can provide a correct output, so as to determine the performance of the model. At the application stage, the resulting machine learning model may be used to process an actual model input based on the set of parameter values obtained from the training process and to determine the corresponding model output.

The OCR techniques may follow a computer vision pipeline where visual features are first extracted from the input image and then feature regression or classification are performed for text detection or recognition. A scene text detector may be trained on fully-annotated data in two categories of approaches. One category of approaches may take a bottom-up process which may first detect low-level text elements like characters, text segments and text keypoints and then group them into words or text lines. The other category of approaches may treat words as one specific type of objects and cause the scene text detectors to detect text bounding boxes directly with object detection or segmentation techniques. Besides, the text specific features may be considered for robust text detection through text border or counter, deformation convolution, local refinement and so on.

Data bias may be addressed in the scene text detection. Some approaches may aim to synthesize scene text images that can be used for training models for scene text detection, recognition and spotting. Some weakly supervised mechanisms may use different types of data for training. Moreover, domain adaptation may be used adapt the synthetic scene text images to real.

In addition, many end-to-end trainable scene text spotters may be designed in which text detector and recognizer are complementary to each other. Some approaches may integrate a scene text detector and a Recurrent Neural Networks (RNN) based recognizer into a unified network. Some approaches may leverage more advanced scene text detectors or recognizers for better text spotting performances. Some approaches may adopt Mask Region-Convolutional Neural Network (R-CNN) as a text detector and character segmentation or attention module for recognition. Some approaches may detect texts with Bezier curves. Some approaches may detect center lines of texts along which characters are recognized in sequence. Some approaches may detect characters by training with weakly supervised mechanism. Some approaches may detect and recognize characters simultaneously. Some other approaches may be designed for text spotting with mask attention guidance.

When a human reads texts in natural scene images, he or she usually utilizes not only the visual features of each text but also his or her linguistic knowledge. The texts may be located and read faster and more easily with the knowledge of the corresponding text language. Therefore, both visual and textual information are useful to robust reading of texts from the natural scene images.

As inspired by the advanced Transformer-based pre-training techniques in Natural Language Processing (NLP), many VLP approaches may promote many multi-modal tasks in computer vision. Joint learning visual and textual representations may be used in many VLP techniques, which may promote various Vision-Language (VL) tasks such as Visual Commonsense Reasoning (VCR), Visual Question Answering (VQA), Image-Text Retrieval, visual relationship detection, visual navigation, visual dialog and/or the like.

Some VLP approaches present a two-stream framework with a vision-language co-attention module for cross-modal feature fusion. Some other VLP approaches follow a single-stream framework, such as a vanilla Bidirectional Encoder Representations from Transformers (BERT) structure, focusing on generic VL tasks including VCR and VQA.

As a language-related task, OCR may be benefit from these VLP techniques. Most VLP models learn from image-text pairs in which images and texts are correlated with each other at a content level (for example, images and captions). These content-relevant image-text pairs may be easily obtained from web, social media, and/or the like, which may be effective for various VL tasks. In contrast, OCR tasks aim to detect and recognize text instances that appear in images. The image-text pairs (for example, images and texts therein) are more difficult to obtain, requiring expensive and inefficient annotations.

Example embodiments of the present disclosure propose a pre-training scheme that exploits textual information to learn visual text representations for scene text detection and spotting. With the scheme, a visual representation of an image is generated with an image encoder, and a textual representation of a text unit in the image is generated with a text encoder. The textual representation is generated based on a plurality of symbols which is obtained by masking one or more symbols of a plurality of symbols in the text unit. Based on the visual and textual representations, a prediction of the masked symbol is determined with a visual-textual decoder. The visual-textual decoder may model relations between the input image and each labelled text unit (or instance). At least the image encoder is updated according to a training objective to increase similarity of the prediction and the masked first symbol.

This scheme presents a weakly supervised pre-training technique for scene text detection and spotting tasks. It focuses on the joint learning of visual and textual information from images and text transcriptions to enhance the learning of visual representations. This scheme may learn better scene text visual representations by feature alignment with textual information. With the learning of textual features, the pre-trained image encoder can attend texts in images well, thereby improving accuracy and efficiency of scene text detection, recognition and spotting. Extensive experiments over multiple public datasets show that the proposed scheme may achieve superior performance on various scene text detection and spotting datasets.

Figure 1:
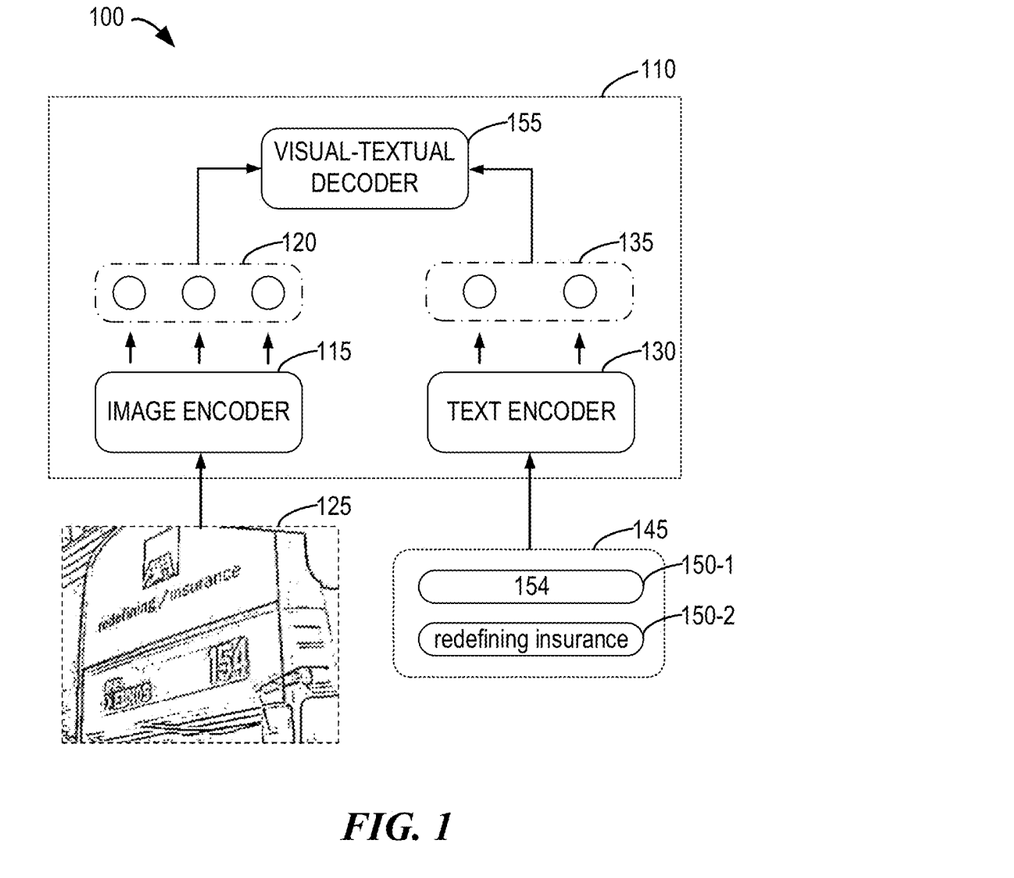
FIG. 1 illustrates an example environment in which example embodiments of the present disclosure may be implemented.

FIG. 1 illustrates an example environment 100 in which example embodiments of the present disclosure may be implemented.

As shown in FIG. 1, the example environment 100 may comprise an electronic device 110 configured to perform a pretraining process for scene text detection to detect, recognize and/or spot a text from an image. The electronic device 110 may be a terminal device that may be various portable or fixed terminals such as tablets, desktops, laptops, mobile phones, general-purpose electronic devices, and/or the like. Alternatively, the electronic device 110 may be a server that may include, but be not limited to, centralized servers, distributed servers, mainframes, edge electronic devices, clouds, and/or the like.

The electronic device 110 may comprise an image encoder 115 for an image encoding process to generate a visual representation 120 from an input image 125. The electronic device 110 may further comprise a text encoder 130 for a text encoding process to generate a textual representation 135 from a text 140 contained in the image 125. In this example, the text 140 may include two text units or text instances 150-1 and 150-2, each comprising a plurality of symbols. One or more symbols in a text unit 150-1 or 150-2 may be masked before the text encoding process.

It is to be understood that the number of images and contained text units as shown is only illustrative but not limited. Any number of images may be used during the pretraining process. An input image may comprise any number of text units, and any number of text units therein may be labeled for the pretraining process.

As shown in FIG. 1, the electronic device 110 may comprise a visual-textual decoder 155 for a decoding process to determine predictions of the masked symbols. The image encoding process may be updated according to a training objective to increase similarity of the predictions and the masked symbols. In some implementations, the image encoding process may be continuously or iteratively trained or updated using a training data set including multiple pairs of images and labeled text units. As such, the visual representation extracted with the image encoding process may be more accurately applied to a scene text detection task such as OCR tasks.

It is to be understood that the units, modules, components, and/or elements in electronic device 110 may be implemented in a variety of ways, including software, hardware, firmware, or any combination thereof. In some applications, the image encoder 115, the text encoder 130 and the visual-textual decoder 155 may be implemented in machine learning models that may be based on any suitable machine learning algorithm.

It is also to be understood that the structure of the electronic device 110 is shown in FIG. 1 is only for the purpose of illustration, without suggesting any limitation. Although the image encoder 115, the text encoder 130 and the visual-textual decoder 155 are shown to be separate from each other, two or more of the image encoder 115, the text encoder 130 and the visual-textual decoder 155 may be integrated into one entity or module. Moreover, the electronic device 110 may further include any other appropriate unit, module, component, and/or component for the implementation of the corresponding function.

Figure 2:
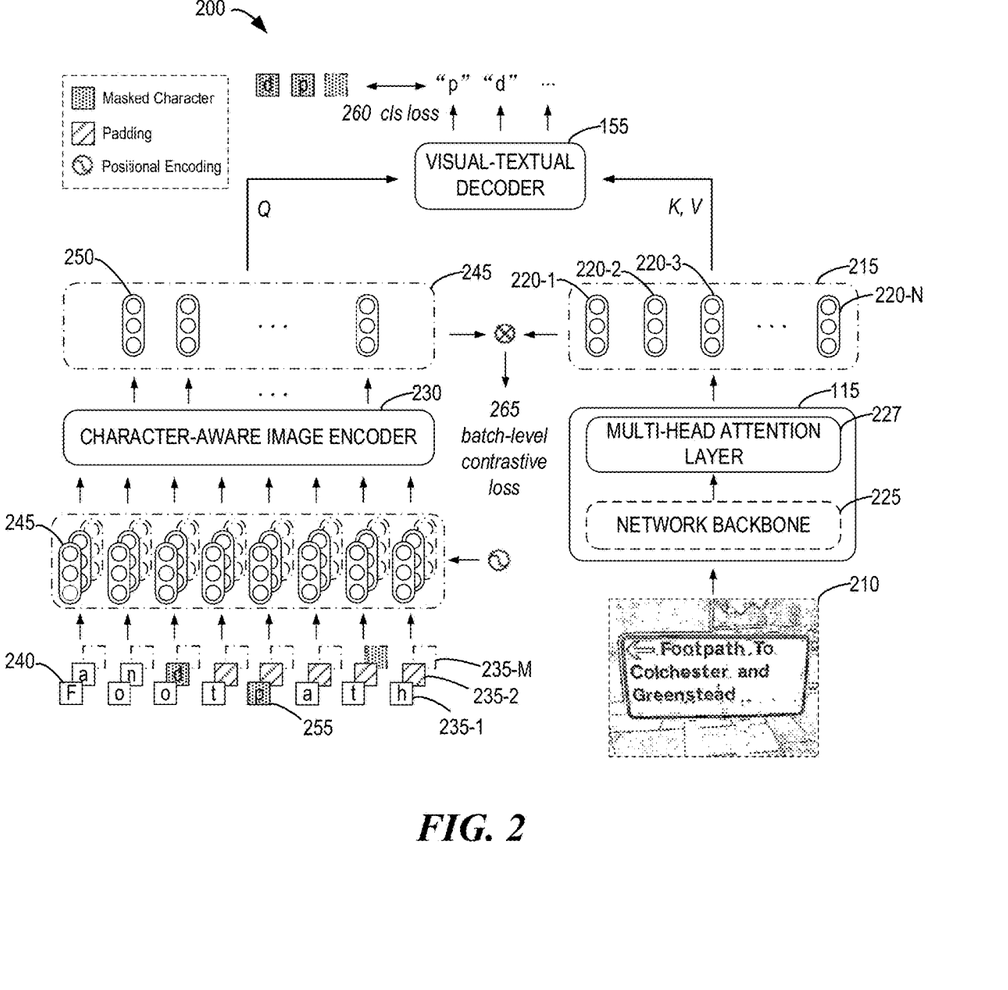
FIG. 2 illustrates a block diagram of an example model architecture for pre-training of the image encoding process in accordance with some embodiments of the present disclosure.

FIG. 2 shows a block diagram of an example model architecture 200 for pre-training of the image encoding process in accordance with some embodiments of the present disclosure.

In the architecture 200, given an input image 210, the image encoder 115 may perform an image encoding process to extract the visual representation 215 that may comprise visual features 220-1, 220-2, 220-3 . . . 220-N (collectively or individually referred to as a visual feature 220) where N denotes a positive integer. The visual features may be implemented in any suitable form. In this example, the image encoder 115 may be implemented based on an attention mechanism. As shown in FIG. 2, the image encoder 115 may include a network backbone 225 followed by a multi-head attention layer 227. The visual features 220 extracted by the multi-head attention layer 227 may be implemented in image embeddings.

The architecture 200 may comprise a character-aware text encoder 230 acting as an example of the text encoder 130 in FIG. 1. The character-aware text encoder 230 may be configured to extract textual information from transcriptions of text units (or instances) contained in input images by encoding a sequence of characters in each text instance.

As shown in FIG. 2, text instances 235-1, 235-2 . . . 235-M (collectively or individually referred to as text instances 235) may be annotated in the image 210 where M denotes any suitable positive integer. A text instance 235 may comprise a plurality of characters 240 (as example of symbols). In some embodiments, a textual representation 250 of the text instance 235 may be generated by aggregating a plurality of character representations 245 extracted from the characters 240. For example, the characters 240 in each text instance 235 may first be transformed to character representations 245, for example, in a form of character embeddings. Then, the character-aware text encoder 205 may extract the textual representations 250 (such as text instance embeddings) from the character representations 240.

In VL tasks, texts (such as titles, captions, and/or the like) are often sentences that consist of sequences of text tokens. Each image in VL tasks is usually associated with one sentence or paragraph where words or phrases (as examples of tokens) are arranged in reading orders. As such, the text encoders for VL tasks are often designed to encode texts in a sequential way. However, the natural scene images in OCR tasks may contain one or multiple text instances. The text tokens within each text instance may be sequentially related to each other (for example, "redefining" and "insurance" in FIG. 1) while those from different text instances may be irrelevant (for example, "insurance" and "154" in FIG. 1). It may be difficult to encode the textual information in a general sequential way.

The character-aware text encoder 205 may extract language features by encoding textual information from the sequence of characters in each text instance without considering the relations among irrelevant text instances. The character-aware text encoder 205 may fit the OCR tasks more.

In some example embodiments, the character-aware text encoder 205 may be implemented by a Transformer model. By way of example, the character-aware text encoder 205 may extract instance-level text embeddings with the input text instances as sequences of characters. Given n annotated text instances $T=\{t_0, t_1, \ldots, t_{n-1}\}$ in an image, each text instance $t_i$ may comprise a sequence of characters $t_i=[c_0^i, c_1^i, \ldots, c_{k-1}^i]$. The characters may be embedded into fixed-sized vectors and a set of learnt positional encoding $PE=[PE_0, PE_1, \ldots, PE_k]$ may be added to capture the sequential information of characters in each text instance, which may be formulated by:

$$ce_j^i = W_c \cdot c_j^i + PE_j, \; i \in [0, n-1], j \in [0, k-1], \quad (1)$$

where $W_c$ denotes the character embedding matrix.

The encoded character embeddings of i-th text instance $ce^i = [ce_0^i, ce_1^i, \ldots, ce_{k-1}^i]$ may be hence passed into a Transformer encoder (as an example implementation of the character-aware text encoder 205) which may model the interaction among all characters in the text instance and extract the text instance embeddings ter from its character embeddings $ce_i$. As a result, the character-aware text encoder 205 may extract the text instance embeddings te=$\{te_0, te_1, \ldots, te_{n-1}\}$ from the annotated text instances t=$\{t_0, t_1, \ldots, t_{n-1}\}$. The character-aware text encoder 205 may encode the instance level textual information and neglect the relations between each pair of text instances. It may help to learn better visual text representations.

Figure 3:
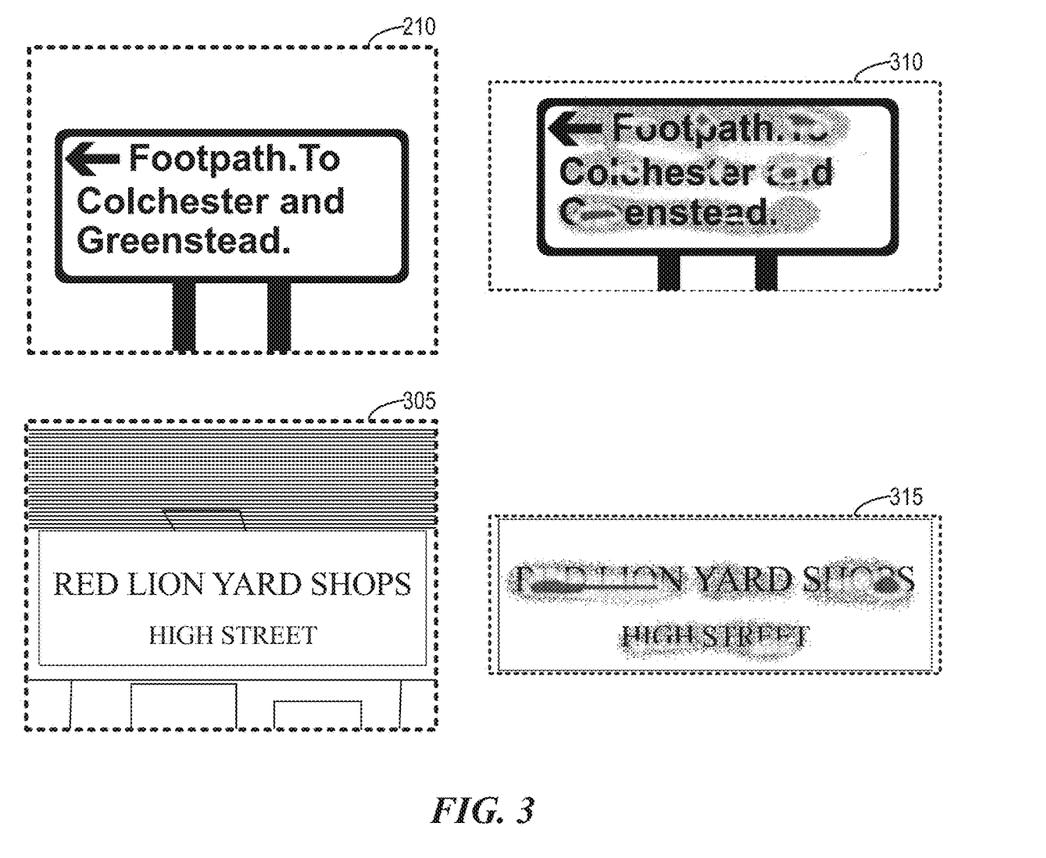
FIG. 3 illustrates two sample images accompanied with attention maps from an attention layer in an image encoder according to some embodiments of the present disclosure.

FIG. 3 shows two sample images accompanied with attention maps from the attention layer 230 in the image encoder 115 according to some embodiments of the present disclosure.

Given sample images 205 and 305 in the first column, and column 2 show the attention maps 310 and 315 (from the attention layer 230 in the image encoder 115) that may be obtained from models with the character-aware text encoder 205. As shown in FIG. 3, the character-aware text encoder 205 may attend better to text regions, leading to better learning of the scene text visual representations of the network backbone 225. It may demonstrate the superiority of the character-aware text encoder 205 on learning visual text representations for scene text detection and spotting tasks.

Still with reference to FIG. 2, the extracted textual and visual features are passed into the visual-textual decoder 155 which may models the interactions among the visual features of input image and the textual features of each individual text instance. During training, a character 255 in each text instance may be masked and the overall network may be optimized by predicting the masked character 255 leveraging the extracted visual and textual features. The character 255 may be randomly selected character by setting it to a mask category, for example.

If fully-annotated data is used for training, bounding boxes or transcriptions of all text instances may be required. However, such annotations may be expensive and difficult to obtain. The visual-textual decoder that models the interaction between the input image and each individual annotated text while ignoring the unlabeled texts, thereby addressing the data annotation bias. The model thus can be trained by using the annotations of partial text instances in the images.

Given an input image I as shown in FIG. 2, after the image embeddings ie and the textual information te by using the image encoder 115 (including the network backbone 225 followed by the multi-head attention layer 227) and the character aware text encoder 230, respectively. The visual-textual decoder 155 hence may learn the relationships among ie and each item in te (such as embeddings of each text instance) to enhance the learning of visual representations.

For example, the visual-textual decoder 155 may comprise a number of stacked decoder layers each of which contains a multi-head attention layer and a feed-forward network (not shown). The number of decoder layers may be any suitable number such as 6. The text instance embeddings te may be passed into the visual-textual decoder 155 as queries and the image embeddings ie may be passed into the decoder 155 as keys and values. This may allow every text instance alone to attend over all positions in the image embeddings.

In some embodiments, a self-attention layer may not be adopted in the visual-textual decoder 155 in order to neglect the relationships between each pair of text instances and eliminates the effects of unlabeled text instances. The model thus can effectively learn from partial annotated text instances.

The visual-textual decoder may predict the masked characters in each text instance for optimization. The masked characters may be predicted by learning the language knowledge from textual information only. The character-aware text encoder 230 and the visual-textual decoder 155 may improve the feasibility of the proposed model on learning from partial text transcriptions only without text bounding boxes.

Figure 4:
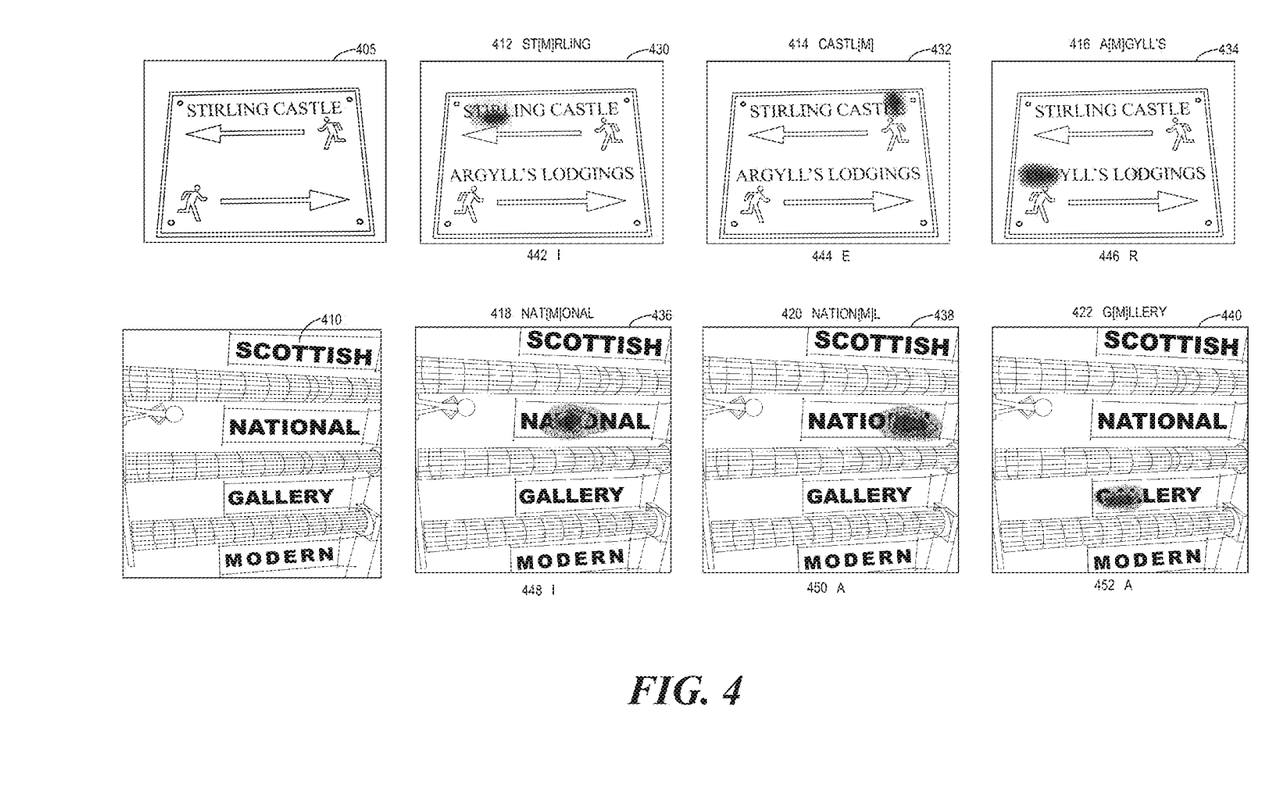
FIG. 4 illustrates attention maps of a visual-textual decoder according to some embodiments of the present disclosure.

FIG. 4 shows attention maps of the visual-textual decoder 155 according to some embodiments of the present disclosure.

Given two sample images 405 and 410 in the first column, input text instances 412, 414, 416, 418, 420 and 422 (masked characters are denoted by [M]), corresponding attention maps 430, 432, 434, 436, 438 and 440 in the decoder 155 and the predicted masked characters 442, 444, 446, 448, 450 and 452 may be shown from top to bottom in each box in columns 2 to 4, respectively. The visual-textual decoder 155 may align the visual and textual features well, which may effectively attend and predict the masked characters in images.

For example, for the sample image 405, the three text instances 412, 414 and 416 (with masked characters [M]) may be passed into the training network to obtain the three attention maps 430, 432 and 434 and three predicted masked characters 442, 444 and 446 each of which corresponds to an input text instance 412, 414 or 416.

As shown in FIG. 4, the visual-textual decoder 155 may not only predict the masked characters (for example, "I" for "ST[M]RLING") but also attend the regions of corresponding masked characters well in the images. The decoder 155 may align the visual and textual features to predict the masked characters (instead of using textual information alone), thereby improving the decoding effectiveness.

Still with reference to FIG. 2, during training, the model may take text instances T (with masked characters $y^{msk}$) and images I as inputs, and may predict the masked characters $p^{msk}(I,T)$ for optimization. By way of example, the masked character prediction may be considered as a classification problem, and cross-entropy H may be adopted for optimization:

$$\mathcal{L}_{cls} = \mathbb{E}_{(I,T)\sim D} H(y^{msk}, p^{msk}(I,T)). \quad (2)$$

where $\mathcal{L}_{cls}$ denotes a classification (cls) loss 260, and $\mathbb{E}_{(I,T)\sim D}$ denotes the expectation.

With the character-aware text encoder 230 and the visual-textual decoder 255, instance-level textual information and learn may be extracted effectively from partial text transcriptions without requiring text bounding boxes. Thus, the learning from weakly annotated texts (for example, partial texts in images without text bounding boxes) may be enabled, which may mitigate the data annotation constraint greatly.

In some embodiments, for further network optimization, a batch-level contrastive loss 265 may be adopted for faster convergence. For example, given N images and N texts in a training batch, $N^2$ (text, image) pairs may be formed from all texts and images, where N pairs of texts and images may be correlated with each other and $N^2-N$ pairs may be unrelated. For each image and text, softmax-normalized image-to-text and text-to-image similarity may be calculated as:

$$p_b^{i2t}(I) = \frac{\exp(I, T_b)}{\sum_{b=1}^{B} \exp(I, T_b)}, \; p_b^{t2i}(T) = \frac{\exp(T, I_b)}{\sum_{b=1}^{B} \exp(T, I_b)}. \quad (3)$$

where B denotes the number of text instances, b denotes the bth text instance, $P_b^{i2t}(I)$ denotes the image-to-text similarity, and $p_b^{t2i}(T)$ denotes the text-to-image similarity.

Let $y^{i2t}(I)$ and $y^{t2i}(T)$ denote the ground-truth one-hot similarity, where negative pairs have a probability of 0 and the positive pair has a probability of 1. The batch-level contrastive loss 265 may thus be defined by:

$$\mathcal{L}_{be} = \mathbb{E}_{(I,T)\sim D}[H(y^{i2t}(I), p^{i2t}(I)) + H(y^{t2i}(T), p^{t2i}(T))], \quad (4)$$

The full pre-training objective may be defined by:

$$\mathcal{L} = \mathcal{L}_{cls} + \mathcal{L}_{be}. \quad (5)$$

During the pre-training, the image encoding process may be updated along with the text encoding process. After the pre-training, the image encoding process may assist in OCR tasks.

Figure 5:
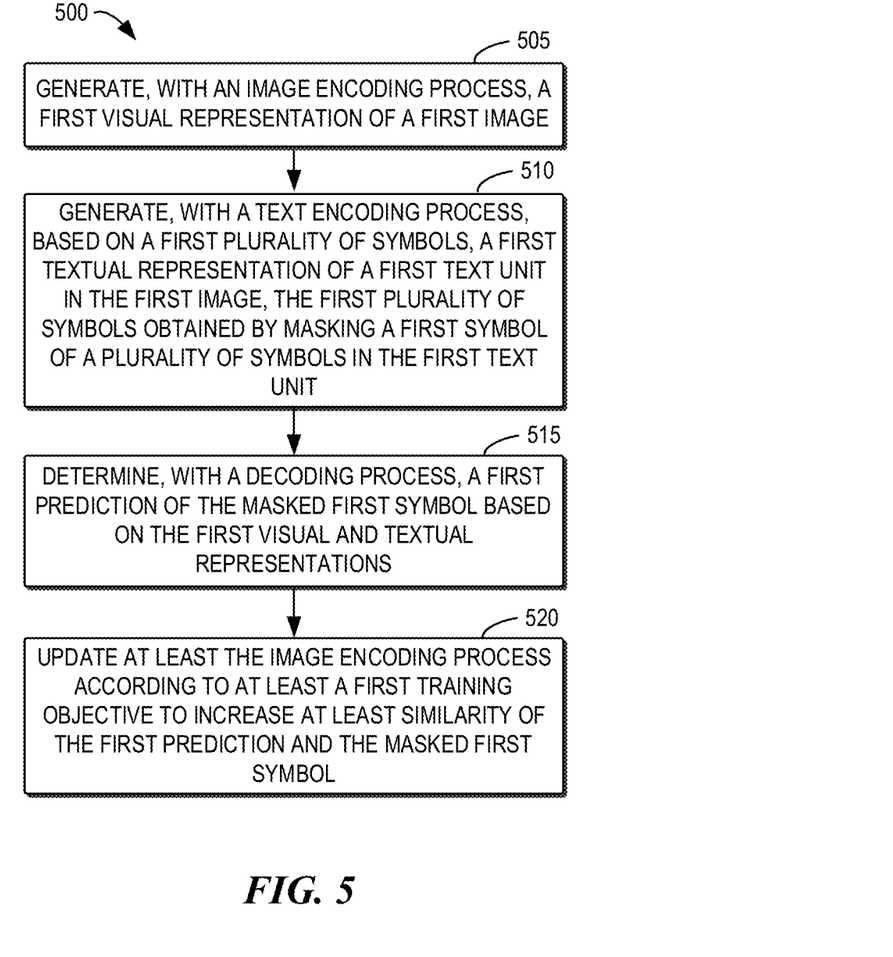
FIG. 5 illustrates a flowchart of an example method of scene text detection in accordance with some example embodiments of the present disclosure.

FIG. 5 shows a flowchart of an example method 500 of scene text detection in accordance with some example embodiments of the present disclosure. The method 500 may be implemented at the electronic device 110 as shown in FIG. 1.

At block 505, a visual representation (referred to as a first visual representation) of an image (referred to as a first image, such as the image 210) is generated with an image encoding process, for example, by the image encoder 115.

At block 510, a textual representation (referred to as a first textual representation) of a text unit (referred to as a first text unit, such as the text instance 150-2) in the first image is generated with a text encoding process, for example, by the text encoder 130. The first textual representation is generated based on a plurality of symbols (referred to as a first plurality of symbols) obtained by masking a symbol (referred to as a first symbol) of a plurality of symbols in the first text unit.

In some embodiments, the language features may be extracted by encoding textual information from the sequence of symbols in each text unit without considering the relations among irrelevant text units. For example, a plurality of symbol representations may be extracted first from the first plurality of symbols, The first textual representation may then be generated by aggregating the plurality of symbol representations. With the learning of textual features, the pre-trained model can attend texts in images well with symbol awareness.

At block 515, a prediction (referred to as a first prediction) of the masked first symbol is determined based on the first visual and textual representations, with a decoding process, for example, by the visual-textual decoder 155. At block 520, at least the image encoding process is updated according to at least a training objective (referred to as a first training objective) to increase at least similarity of the first prediction and the masked first symbol, for example, by utilizing the equation (2). In some embodiments, the image encoding process may be updated along with the text encoding process.

In some embodiments, the first text unit may comprise a part of a text in the first image. The visual-textual decoder 155 may model the relations between the input image and each labelled text instance only instead of all captured texts in the input image. As such, the network may learn effective visual text representations from weakly-annotated data (i.e. partial text instances in images without text bounding boxes) which may greatly mitigate the data acquisition challenge, enable exploitation of large amounts of weakly-annotated images and significantly promote different scene text detectors and spotters.

In some embodiments, the first image may comprise a number of text units such as the text units 150-1 and 150-2. In this example, with the text encoding process, based on a second plurality of symbols, another textual representation (referred to as a second textual representation) of another text unit (referred to as a second text unit) in the first image may be generated based on a plurality of other symbols (referred to as the second plurality of symbols) obtained by masking a symbol (referred to as a second symbol) of a plurality of symbols in the second text unit. With the decoding process, a predication (referred to as a second prediction) of the masked second symbol may be determined based on the first visual representation and the second textual representations. The first training objective for updating the image encoding process may be further to increase similarity of the second prediction and the masked second symbol.

In addition to the first training objective, in some embodiments, the image encoding process may be updated according to a further training objective (referred to as a second training objective) to increase at least similarity of the first visual and textual representations. As such, a probability of the positive pair may be increased.

In some embodiments, the pre-training may be performed in a training batch that may comprise a plurality of pairs of images and labeled text units. In this example, a visual representation (referred to as a second visual representation) of a further image (referred to as a second image) may be generated with the image encoding process. A textual representation (referred to as a third textual representation) of a text unit (referred to as a third text unit) in the second image may be generated with the text encoding process based on a third plurality of symbols (referred to as a third plurality of symbols) obtained by masking a symbol (referred to as a third symbol) of a plurality of symbols in the third text unit.

Then, image encoding process may be updated according to the second training objective to increase further similarity of the second visual representation and the third textual representation. In some embodiments, the second training objective may be further to decrease similarity of the second visual representation and the first textual representation and similarity of the first visual representation and the third textual representation, for example, using equation (4).

Experiments over the weakly annotated images in many training datasets show that the pre-trained model improves the scene text detection and spotting performance.

Table 1 shows scene text detection performances of different models on ICDAR2019-LSVT dataset. "+oCLIP" denotes that the pre-trained model with 400,000 weakly annotated images in ICDAR2019-LSVT dataset may be adopted for fine-tuning.

TABLE 1

| Model | Precision | Recall | F-score |
|---|---|---|---|
| MSR | 86.4 | 63.4 | 73.1 |
| Keypoint | 78.5 | 70.1 | 74.1 |
| DB | 76.5 | 70.5 | 73.4 |
| DB + oCLIP | 81.5 | 70.9 | 76.8 |
| PSENet | 90.4 | 63.5 | 74.6 |
| PSENet + oCLIP | 90.7 | 67.0 | 77.1 |

As shown in Table 1, the model with the pre-trained model may have better scene text detection performances.

Table 2 shows scene text spotting performances of different models on ICDAR2019-LSVT dataset. "+oCLIP" denotes that the pre-trained model with 400,000 weakly annotated images in ICDAR2019-LSVT dataset may be adopted for fine-tuning. "P", "R", "F", "1-NED", and "E2E" may refer to Precision, Recall, F-score, Normalized metric in terms of Normalized Edit Distance, and end-to-end, respectively.

TABLE 2

| | Detection | | | E2E Spotting | | | |
|---|---|---|---|---|---|---|---|
| Method | P | R | F | 1-NED | P | R | F |
| Mask TextSpotter-V3 | 80.5 | 61.0 | 69.4 | 35.7 | 32.1 | 24.4 | 27.7 |
| Mask TextSpotter-V3 + oCLIP | 80.8 | 61.9 | 70.1 | 39.0 | 37.4 | 28.7 | 32.5 |

As shown in Table 2, the model with the pre-trained model may have better scene text spotting performances.

Table 3 shows the effectiveness of the proposed weakly supervised pre-training technique. Four models may be pre-trained by using different proportions of text instances in SynthText dataset (for example, 1 out of 4 text instances in each image are used for training for "25%" model), and the model weights may be transferred to fine-tune PSENet on Total-Text dataset. Baseline is to train PSENet on SynthText and then fine-tune on Total-Text.

TABLE 3

| % annotated texts | Precision | Recall | F-score |
|---|---|---|---|
| No Pre-train | 81.8 | 75.1 | 78.3 |
| Baseline | 87.8 | 79.0 | 82.6 |
| 25% | 90.2 | 80.1 | 84.8 |
| 50% | 91.1 | 80.0 | 85.2 |
| 75% | 90.6 | 80.8 | 85.4 |
| 100% | 90.7 | 80.8 | 85.5 |

As shown in Table 3, partial texts (even 25% annotated texts) may achieve better effectiveness.

Table 4 shows comparison with different scene text pre-training techniques. By pre-training on the same set of data (i.e. SynthText dataset), the proposed pre-training scheme may outperform other pre-training techniques consistently across different datasets. "+SynthText" may denote training PSENet with SynthText and then fine-tuning with Total-Text.

TABLE 4

| | Total-Text | | | CTW1500 | | |
|---|---|---|---|---|---|---|
| Model | P | R | F | P | R | F |
| PSENet | 81.8 | 75.1 | 78.3 | 80.6 | 75.6 | 78.0 |
| PSENet + Synth Text | 87.8 | 79.0 | 82.6 | 81.8 | 77.8 | 79.7 |
| PSENet + STKM | 86.3 | 78.4 | 82.2 | 85.1 | 78.2 | 81.5 |
| PSENet + oCLIP[SynthText] | 90.7 | 80.8 | 85.5 | 86.3 | 79.6 | 82.8 |
| PSENet + oCLIP [Web Images] | 92.2 | 82.4 | 87.0 | 87.5 | 79.9 | 83.5 |

Table 5 shows comparison with different scene text detection techniques on CTW1500 dataset. "+oCLIP" may denote that the pre-trained model on SynthText dataset is adopted for fine-tuning. "RN50", "PD", "Syn", and "MLT" may refer to ResNet-50, pre-training data, SynthText dataset, and ICDAR2027-MLT dataset, respectively.

TABLE 5

| Model | PD | Precision | Recall | F-score |
|---|---|---|---|---|
| TextSnake | Syn | 67.9 | 85.3 | 75.6 |
| ATRR | — | 80.1 | 80.2 | 80.1 |
| TextField | Syn | 83.0 | 79.8 | 81.4 |
| Keypoint | Syn | 88.3 | 77.7 | 82.7 |
| PAN | Syn | 88.0 | 79.4 | 83.5 |
| CRAFT | Syn | 86.4 | 81.4 | 83.7 |
| ContoneNet | — | 83.7 | 84.1 | 83.9 |
| SD | MLT | 85.8 | 82.3 | 84.0 |
| DRRG | MLT | 85.9 | 83.0 | 84.5 |
| TextBPN | Sys | 87.8 | 81.5 | 84.5 |
| DB-RN50 | — | 81.1 | 80.6 | 80.8 |
| DB-RN50 + oCLIP | Syn | 82.5 | 81.5 | 82.0 (+1.2) |
| FCENet-RN50 | — | 85.7 | 80.7 | 83.1 |
| FCENet-RN50 + oCLIP | Syn | 87.2 | 83.9 | 85.6 (+2.5) |

Table 6 shows comparison with different scene text detection techniques on Total-Text dataset. "+oCLIP" denotes that the pre-trained model on SynthText dataset may be adopted for fine-tuning. "RN50", "PD", "Syn", and "MLT"

refer to ResNet-50, pretraining data, SynthText dataset, and ICDAR2027-MLT dataset, respectively.

TABLE 6

| Model | PD | Precision | Recall | F-score |
|---|---|---|---|---|
| TextSnake | Syn | 82.7 | 74.5 | 78.4 |
| ATRR | — | 80.9 | 76.2 | 78.5 |
| MSR | Syn | 83.8 | 74.8 | 79.0 |
| TextField | Syn | 81.2 | 79.9 | 80.6 |
| PAN | Syn | 88.0 | 79.4 | 83.5 |
| CRAFT | MLT | 87.6 | 79.9 | 83.6 |
| Keypoint | Syn | 86.1 | 82.6 | 84.4 |
| ContoneNet | — | 86.5 | 84.9 | 85.4 |
| DRRG | MLT | 86.5 | 84.9 | 85.7 |
| SD | MLT | 89.2 | 84.7 | 86.9 |
| DB-RN50 | — | 81.7 | 75.0 | 78.2 |
| DB-RN50 + oCLIP | Syn | 86.1 | 82.1 | 84.1 (+5.9) |
| TextBPN | — | 88.0 | 82.9 | 85.4 |
| TextBPN + oCLIP | Syn | 89.0 | 85.3 | 87.1 (+1.7) |

Table 7 show comparison with different scene text detection techniques on ICDAR2015 dataset. "+oCLIP" may refer to that the pre-trained model on SynthText dataset may be adopted for fine-tuning. "RN50", "PD", "Syn", and "MLT" may refer to ResNet-50, pre-training data, SynthText dataset, and ICDAR2027-MLT dataset, respectively.

TABLE 7

| Model | PD | Precision | Recall | F-score |
|---|---|---|---|---|
| SegLink | Syn | 76.1 | 76.8 | 75.0 |
| TextField | Syn | 84.3 | 80.1 | 82.4 |
| TextSnake | Syn | 84.9 | 80.4 | 82.6 |
| PAN | Syn | 84.0 | 81.9 | 82.9 |
| ATRR | — | 90.4 | 83.3 | 86.8 |
| CRAFT | MLT | 89.8 | 84.3 | 86.9 |
| ContourNet | — | 87.6 | 86.1 | 86.9 |
| SD | MLT | 88.7 | 88.4 | 88.6 |
| DB-RN50 | — | 89.3 | 74.0 | 80.9 |
| DB-RN50 + oCLIP | Syn | 89.1 | 82.0 | 85.4 (+4.5) |
| FCENet-RN50 | — | 88.0 | 81.9 | 81.9 |
| FCENet-RN50 + oCLIP | Syn | 91.2 | 82.7 | 86.7 (+1.8) |

Table 8 shows comparison with different scene text spotting techniques on ICDAR2015 and Total-Text dataset. "+oCLIP" denotes that the model may be fine-tuned from the pre-trained model on SynthText dataset. "S", "W", and "G" may refer to end-to-end recognition with strong, weak, generic lexicon for ICDAR2015. "Full" may refer to full lexicon for Total-Text.

TABLE 8

| | ICDAR2015 | | | Total-Text |
|---|---|---|---|---|
| Model | S | W | G | Full |
| CharNet | 80.1 | 74.5 | 62.2 | — |
| POTS | 83.6 | 74.5 | 62.2 | — |
| TextDragon | 82.5 | 78.3 | 65.2 | 74.8 |
| Boundary TextSpotter | 79.7 | 75.2 | 64.1 | — |
| PAN++ | 82.7 | 78.2 | 69.2 | 78.6 |
| ABCNet-V2 | 82.7 | 78.5 | 73.0 | 76.1 |
| Mask TextSpotter-V3 | 81.3 | 78.1 | 74.2 | 78.4 |
| Mask TextSpotter-V3 + oCLIP | 84.1 | 78.6 | 74.3 | 79.6 |

Table 9 shows ablation study of the proposed scheme for scene text detection over Total-Text dataset. PSENet may be fine-tuned by using the pre-trained models with different modules. "CAE", "VTD", and "BCL" may refer to character-aware encoder, visual-textual decoder, and batch-level contrastive loss, respectively.

TABLE 9

| | CAE | VTD | BCL | Precision | Recall | F-score |
|---|---|---|---|---|---|---|
| No Pretrain | | | | 81.8 | 75.1 | 78.3 |
| 1 | | | ✓ | 88.1 | 77.7 | 82.6 |
| 2 | ✓ | | ✓ | 89.6 | 78.9 | 83.9 |
| 3 | ✓ | ✓ | | 89.3 | 77.4 | 82.9 |
| 4 | ✓ | ✓ | ✓ | 90.7 | 80.8 | 85.5 |

Figure 6:
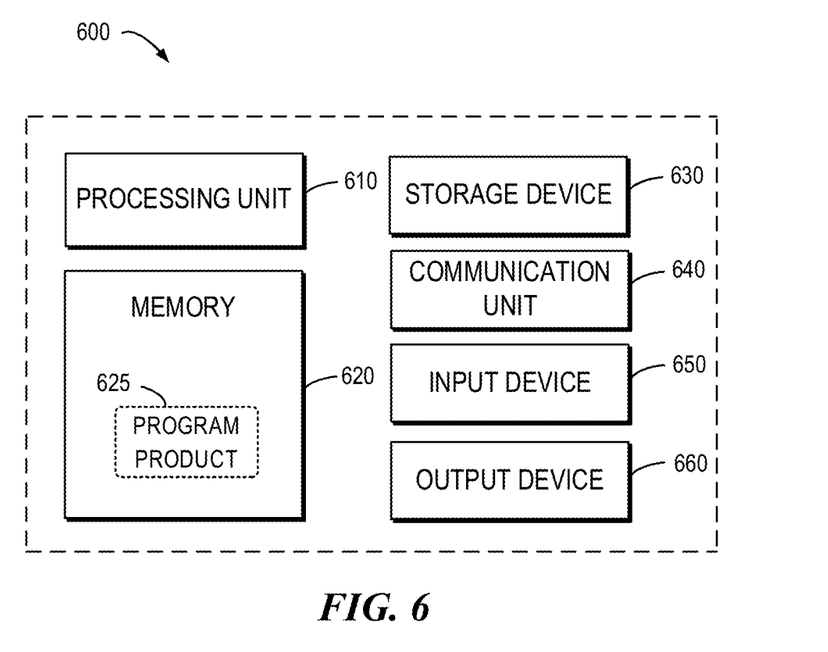
FIG. 6 illustrates a block diagram of an example computer readable medium in accordance with some example embodiments of the present disclosure.

FIG. 6 shows a block diagram illustrating an electronic device 600 in which one or more embodiments of the present disclosure may be implemented. The electronic device 600 shown in FIG. 6 may be an example implementation of the electronic device 110 of FIG. 1.

As shown in FIG. 6, the electronic device 600 is in the form of a general-purpose computing device. The components of the electronic device 600 may include, but are not limited to, one or more processors or processing units 610, a memory 620, a storage device 630, one or more communication units 640, one or more input devices 650, and one or more output devices 660. The processing unit 610 may be an actual or virtual processor and can perform various processes according to a program stored in the memory 620. In a multiprocessor system, a plurality of processing units execute computer executable instructions in parallel to improve the parallel processing capability of the electronic device 600.

The electronic device 600 typically includes a plurality of computer storage media. Such media may be any available media accessible to the electronic device 600, including but not limited to volatile and nonvolatile media, removable and non-removable media. The memory 620 may be volatile memory such as register, cache and random access memory (RAM), non-volatile memory such as read only memory (ROM), electrically erasable programmable read only memory (EEPROM) and flash memory, or some combination thereof. The storage device 630 may be a removable or non-removable medium, and may include a machine-readable medium, such as a flash drive, a magnetic disk, or any other medium, which may be capable of storing information and/or data (for example, training data for training) and may be accessed within the electronic device 600.

The electronic device 600 may further include additional removable/non-removable, volatile/nonvolatile storage media. Although not shown in FIG. 6, a disk drive for reading or writing from a removable, nonvolatile disk (for example, "floppy disk") and an optical disk drive for reading or writing from a removable, nonvolatile optical disk may be provided. In these cases, each driver may be connected to a bus (not shown) by one or more data medium interfaces. The memory 620 may include a computer program product 625 having one or more program modules configured to perform various methods or actions of various embodiments of the present disclosure.

The communication unit 640 enables communication with other computing devices through a communication medium. In addition, the functions of the components of the electronic device 600 may be implemented in a single computing cluster or a plurality of computing machines capable of communicating through a communication connection. Thus, the electronic device 600 may operate in a networked environment using logical connections with one or more other servers, network personal computers (PCS), or another network node.

The input device 650 may be one or more input devices, such as a mouse, a keyboard, a trackball, and the like. The output device 660 may be one or more output devices, such as a display, a speaker, a printer, and the like. The electronic device 600 may also communicate with one or more external devices (not shown), such as a storage device, a display device, and the like, through the communication unit 640 as needed, with one or more devices that enable the user to interact with the electronic device 600, or with any device (for example, a network card, a modem, and/or like) that causes the electronic device 600 to communicate with one or more other computing devices. Such communication may be performed via an input/output (I/O) interface (not shown).

According to an example implementation of the present disclosure, there is provided a computer-readable storage medium on which computer executable instructions are stored, where the computer executable instructions are executed by a processor to implement the methods described above According to an example implementation of the present disclosure, there is also provided a computer program product that is tangibly stored on a non-transitory computer-readable medium and includes computer executable instructions that are executed by a processor to implement the methods described above.

Various aspects of the present disclosure are described herein with reference to flowcharts and/or block diagrams of methods, apparatuses, devices, and computer program products implemented in accordance with the present disclosure. It is to be understood that each block of the flowchart and/or the block diagram and combinations of blocks in the flowchart and/or the block diagram may be implemented by computer readable program instructions.

These computer readable program instructions may be provided to a processing unit of a general-purpose computer, a special-purpose computer, or other programmable data processing apparatus to produce a machine such that when these instructions are executed by a processing unit of a computer or other programmable data processing apparatus, means for implementing the functions/actions specified in one or more of the flow charts and/or block diagrams are generated. These computer-readable program instructions may also be stored in a computer-readable storage medium, which causes the computer, the programmable data processing apparatus and/or other devices to operate in a specific manner, so that the computer-readable medium in which the instructions are stored comprises a product, which includes instructions to implement various aspects of the functions/actions specified in one or more of the flow charts and/or block diagrams.

Computer readable program instructions may be loaded onto a computer, other programmable data processing devices, or other devices to cause a series of operation steps to be performed on the computer, other programmable data processing devices, or other devices to generate a computer implemented processor instructions executed on other devices to implement the functions/actions specified in one or more blocks in the flowchart and/or block diagram.

The flow diagrams and block diagrams in the accompanying drawings show architectures, functions, and operations of possible implementations of systems, methods, and computer program products in accordance with various implementations of the present disclosure. In this regard, each block in the flowchart or block diagram may represent a part of a module, program segment or instructions, and a part of the module, program segment or instructions contains one or more executable instructions for implementing a specified logical function. In some alternative implementations, the functions indicated in the box may also occur in a different order than those indicated in the drawings. For example, two consecutive blocks may actually be performed substantially in parallel, and they may sometimes be performed in a reverse order, depending on the function involved. It should also be noted that each block in the block diagram and/or the flowchart, and the combination of the blocks in the block diagram and/or the flowchart, may be realized by a dedicated hardware based system that performs a predetermined function or action, or may be implemented by a combination of dedicated hardware and computer instructions.

The implementations of the present disclosure have been described above, and the above description is exemplary, not exhaustive, and is not limited to the disclosed implementations. Without departing from the scope and spirit of the described implementations, many modifications and changes will be obvious to those of ordinary skill in the art. The choice of terms used herein is intended to best explain the principles, practical applications or improvements to technologies in the market of each implementation, or to enable other ordinary technicians in the technical field to understand each implementation mode disclosed herein.

What is claimed is:

1. A method of scene text detection, comprising:
generating, with an image encoding process, a first visual representation of a first image;
generating, with a text encoding process, based on a first plurality of symbols, a first textual representation of a first text unit in the first image, the first plurality of symbols obtained by masking a first symbol of a plurality of symbols in the first text unit;
determining, with a decoding process, a first prediction of the masked first symbol based on the first visual and textual representations; and
updating at least the image encoding process according to at least a first training objective to increase at least similarity of the first prediction and the masked first symbol.

2. The method of claim 1, wherein generating the first textual representation comprises:
extracting a plurality of symbol representations from the first plurality of symbols; and
generating the first textual representation by aggregating the plurality of symbol representations.

3. The method of claim 1, wherein the first text unit comprises a part of a text in the first image.

4. The method of claim 1, further comprising:
generating, with the text encoding process, based on a second plurality of symbols, a second textual representation of a second text unit in the first image, the second plurality of symbols obtained by masking a second symbol of a plurality of symbols in the second text unit; and
determining, with the decoding process, a second prediction of the masked second symbol based on the first visual representation and the second textual representations,
where the first training objective is further to increase similarity of the second prediction and the masked second symbol.

5. The method of claim 1, wherein updating the image encoding process comprises:
updating the image encoding process according to further a second training objective to increase at least similarity of the first visual and textual representations.

6. The method of claim 5, further comprising:
generating, with the image encoding process, a second visual representation of a second image; and generating, with the text encoding process, based on a third plurality of symbols, a third textual representation of a third text unit in the second image, the third plurality of symbols obtained by masking a third symbol of a plurality of symbols in the third text unit, wherein the second training objective is further to increase similarity of the second visual representation and the third textual representation.

7. The method of claim 6, wherein the second training objective is further to decrease similarity of the second visual representation and the first textual representation and similarity of the first visual representation and the third textual representation.

8. The method of claim 1, wherein updating at least the image encoding process comprises:
updating the image encoding process along with the text encoding process.

9. An electronic device, comprising:
at least one processor; and
at least one memory communicatively coupled to the at least one processor and comprising computer-readable instructions that upon execution by the at least one processor cause the at least one processor to perform acts comprising:
generating, with an image encoding process, a first visual representation of a first image;
generating, with a text encoding process, based on a first plurality of symbols, a first textual representation of a first text unit in the first image, the first plurality of symbols obtained by masking a first symbol of a plurality of symbols in the first text unit;
determining, with a decoding process, a first prediction of the masked first symbol based on the first visual and textual representations; and
updating at least the image encoding process according to at least a first training objective to increase at least similarity of the first prediction and the masked first symbol.

10. The electronic device of claim 9, wherein generating the first textual representation comprises:
extracting a plurality of symbol representations from the first plurality of symbols; and
generating the first textual representation by aggregating the plurality of symbol representations.

11. The electronic device of claim 9, wherein the first text unit comprises a part of a text in the first image.

12. The electronic device of claim 9, wherein the acts further comprise:
generating, with the text encoding process, based on a second plurality of symbols, a second textual representation of a second text unit in the first image, the second plurality of symbols obtained by masking a second symbol of a plurality of symbols in the second text unit; and
determining, with the decoding process, a second prediction of the masked second symbol based on the first visual representation and the second textual representations,
where the first training objective is further to increase similarity of the second prediction and the masked second symbol.

13. The electronic device of claim 9, wherein updating the image encoding process comprises:
updating the image encoding process according to further a second training objective to increase at least similarity of the first visual and textual representations.

14. The electronic device of claim 13, wherein the acts further comprise:
generating, with the image encoding process, a second visual representation of a second image; and
generating, with the text encoding process, based on a third plurality of symbols, a third textual representation of a third text unit in the second image, the third plurality of symbols obtained by masking a third symbol of a plurality of symbols in the third text unit,
wherein the second training objective is further to increase similarity of the second visual representation and the third textual representation.

15. The electronic device of claim 14, wherein the second training objective is further to decrease similarity of the second visual representation and the first textual representation and similarity of the first visual representation and the third textual representation.

16. The electronic device of claim 9, wherein updating at least the image encoding process comprises:
updating the image encoding process along with the text encoding process.

17. A non-transitory computer-readable storage medium, storing computer-readable instructions that upon execution by a computing device cause the computing device to perform acts comprising:
generating, with an image encoding process, a first visual representation of a first image;
generating, with a text encoding process, based on a first plurality of symbols, a first textual representation of a first text unit in the first image, the first plurality of symbols obtained by masking a first symbol of a plurality of symbols in the first text unit;
determining, with a decoding process, a first prediction of the masked first symbol based on the first visual and textual representations; and
updating at least the image encoding process according to at least a first training objective to increase at least similarity of the first prediction and the masked first symbol.

18. The computer-readable storage medium of claim 17, wherein generating the first textual representation comprises:
extracting a plurality of symbol representations from the first plurality of symbols; and
generating the first textual representation by aggregating the plurality of symbol representations.

19. The computer-readable storage medium of claim 17, wherein updating the image encoding process comprises:
updating the image encoding process according to further a second training objective to increase at least similarity of the first visual and textual representations.

20. The computer-readable storage medium of claim 19, wherein the acts further comprise:
generating, with the image encoding process, a second visual representation of a second image; and
generating, with the text encoding process, based on a third plurality of symbols, a third textual representation of a third text unit in the second image, the third plurality of symbols obtained by masking a third symbol of a plurality of symbols in the third text unit,
wherein the second training objective is further to increase similarity of the second visual representation and the third textual representation and to decrease similarity of the second visual representation and the first textual representation and similarity of the first visual representation and the third textual representation.

\* \* \* \* \*